United States Patent [19]

Isono et al.

[11] Patent Number: 5,218,663
[45] Date of Patent: Jun. 8, 1993

[54] OPTICAL WAVEGUIDE DEVICE AND METHOD FOR CONNECTING OPTICAL WAVEGUIDE AND OPTICAL FIBER USING THE OPTICAL WAVEGUIDE DEVICE

[75] Inventors: Hideki Isono; Kaoru Moriya; Eiji Kikuchi, all of Kawasaki, Japan

[73] Assignee: Fujitsu Limited, Kawasaki, Japan

[21] Appl. No.: 850,872

[22] Filed: Mar. 13, 1992

[30] Foreign Application Priority Data

Mar. 19, 1991 [JP] Japan .................................. 3-78268

[51] Int. Cl.$^5$ ............................. G02B 7/26; G02B 6/44
[52] U.S. Cl. .................................................. 385/129
[58] Field of Search ........................ 385/129, 130, 142

[56] References Cited

U.S. PATENT DOCUMENTS

| | | | |
|---|---|---|---|
| 4,901,321 | 2/1990 | Blondeau et al. | 385/130 X |
| 4,933,262 | 6/1990 | Beguin | 385/130 X |
| 5,119,460 | 6/1992 | Bruce et al. | 385/142 |
| 5,134,681 | 7/1992 | Ratovelomanana et al. | 385/129 |

FOREIGN PATENT DOCUMENTS 63-311212 12/1988 Japan .
63-316009 12/1988 Japan .
01234806 9/1989 Japan .

*Primary Examiner*—Akm E. Ullah

[57] ABSTRACT

An optical waveguide device which can be connected with an optical fiber through a simple positioning adjustment. The optical waveguide device comprises a substrate, a first cladding with a uniform thickness formed on the substrate, a core formed on the first cladding, a recognizable thin layer formed on the first cladding on both sides of the core, and a second cladding formed on the first cladding so as to cover the core. The thin layer is parallel to the top surface of the substrate and defines a reference plane which is substantially in the same plane as the bottom surface of the core. Connection of the optical waveguide device with the optical fiber is achieved by bringing the reference plane into contact with a plane which is in a predetermined relative position to the optical fiber and only making a planar positioning adjustment with the planes held in contact.

6 Claims, 4 Drawing Sheets

FIG.I(A)
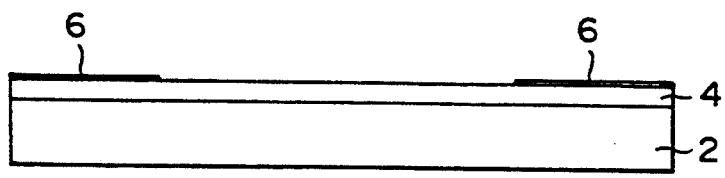
FIG.I(B)
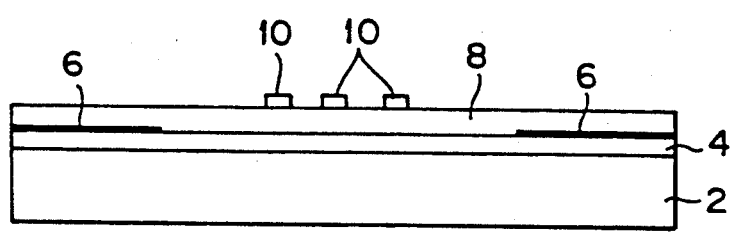
FIG.I(C)
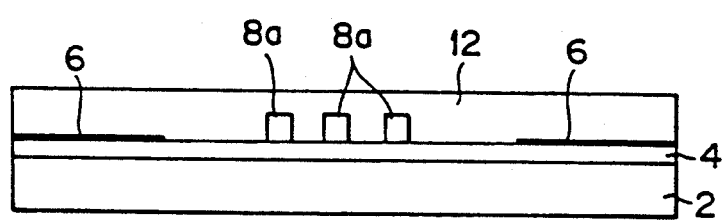
FIG.I(D)
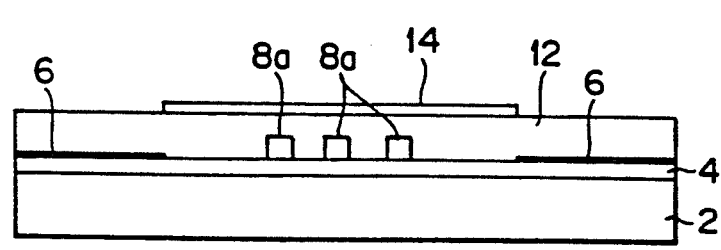
FIG.I(E)
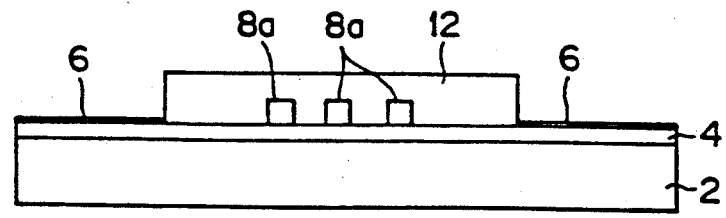

OPTICAL WAVEGUIDE DEVICE AND METHOD FOR CONNECTING OPTICAL WAVEGUIDE AND OPTICAL FIBER USING THE OPTICAL WAVEGUIDE DEVICE

BACKGROUND OF THE INVENTION

1. Field of the Invention

The present invention relates to an optical waveguide device and a method for connecting an optical waveguide and an optical fiber using the optical waveguide device.

2. Description of the Related Art

In the field of optical communication or optical transmission, various optical devices such as optical switches and optical couplers are used in addition to optical transmitters, optical receivers, and optical transmission lines. As one of the types of such optical devices, there is an optical waveguide device. The optical waveguide device is arranged in such a way that an optical waveguide is formed on a substrate and a light beam is controlled while it is confined in the optical waveguide. Because of its structure, the optical waveguide device has such advantages that it can be easily miniaturized and produced on a mass scale using the planar technique and, in addition, that electric field or magnetic field can be applied thereto effectively. In such optical waveguide devices, it sometimes becomes necessary to connect a plurality of optical fibers with it as is the case with a waveguide type star coupler. Therefore, there have been demands for such an optical waveguide device that can be easily connected with optical fibers.

In connecting an optical waveguide device and optical fibers, it has so far been practiced to adjust position of the optical fibers relative to input and output terminals of the optical waveguide device individually and, then, to fix the optical fibers to the input and output terminals of the optical waveguide device with an optical bonding agent having a desired refractive index. This connecting method, however, takes much time in adjusting position of the optical fibers and involves a problem that troublesome work is required for connecting the optical waveguide device with optical fibers.

There is proposed a method to connect an optical fiber to an optical waveguide device in which a groove or a pair of projections are formed on the substrate of the optical waveguide device and the optical fiber is mounted in the groove or between the pair of projections, and connection is thereby achieved without making positioning adjustments of the optical fiber. According to this connecting method, while the need for positioning adjustments of the optical fiber can be eliminated, there is a problem that the groove or the pair of projections must be made with high precision in order to achieve a low-loss optical connection.

SUMMARY OF THE INVENTION

Accordingly, an object of the present invention is to provide an optical waveguide device which can be easily connected with an optical fiber.

Another object of the present invention is to provide a method for easily connecting an optical waveguide and an optical fiber using the optical waveguide device.

In accordance with an aspect of the present invention, there is provided an optical waveguide device comprising a substrate having a top surface, a first cladding with a uniform thickness formed on the substrate, a core formed on the first cladding, a recognizable thin layer formed on the first cladding on both sides of the core, the thin layer defining a reference plane which is parallel to the top surface of the substrate and lies substantially in the same plane as the bottom surface of the core, and a second cladding formed on the first cladding so as to cover the core.

In accordance with another aspect of the present invention, there is provided an optical waveguide device comprising a substrate having a top surface, a first cladding with a uniform thickness formed on the substrate, a core formed on the first cladding, a reference layer with the same thickness as the core formed on the first cladding on both sides of the core, the reference layer defining a reference plane lying in the same plane as the top surface of the core, and a second cladding formed on the first cladding so as to cover the core.

Since the optical waveguide device of the present invention is provided with a reference plane parallel to the surface of the substrate on both sides of the core, the connection of the optical waveguide device with an optical fiber can be achieved by bringing the reference plane into contact with a plane which is in a predetermined relative position to the optical fiber and making only a planar positioning adjustment. Thus, the connection of the optical waveguide device with the optical fiber can be achieved using smaller man-hours than positional adjustment than in the conventional connecting method.

In other words, the present invention, by providing a plane in a predetermined relative position to an optical fiber to which the optical waveguide device is to be connected, makes it possible to make positioning adjustment only by planar sliding between the plane and the reference plane and achieve the connection between the optical fiber and the optical waveguide device with a high optical coupling efficiency.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 1(A) to 1(E) are views showing a manufacturing process of an optical waveguide device as an embodiment of the present invention;

DESCRIPTION OF THE PREFERRED EMBODIMENTS

Figure 2:
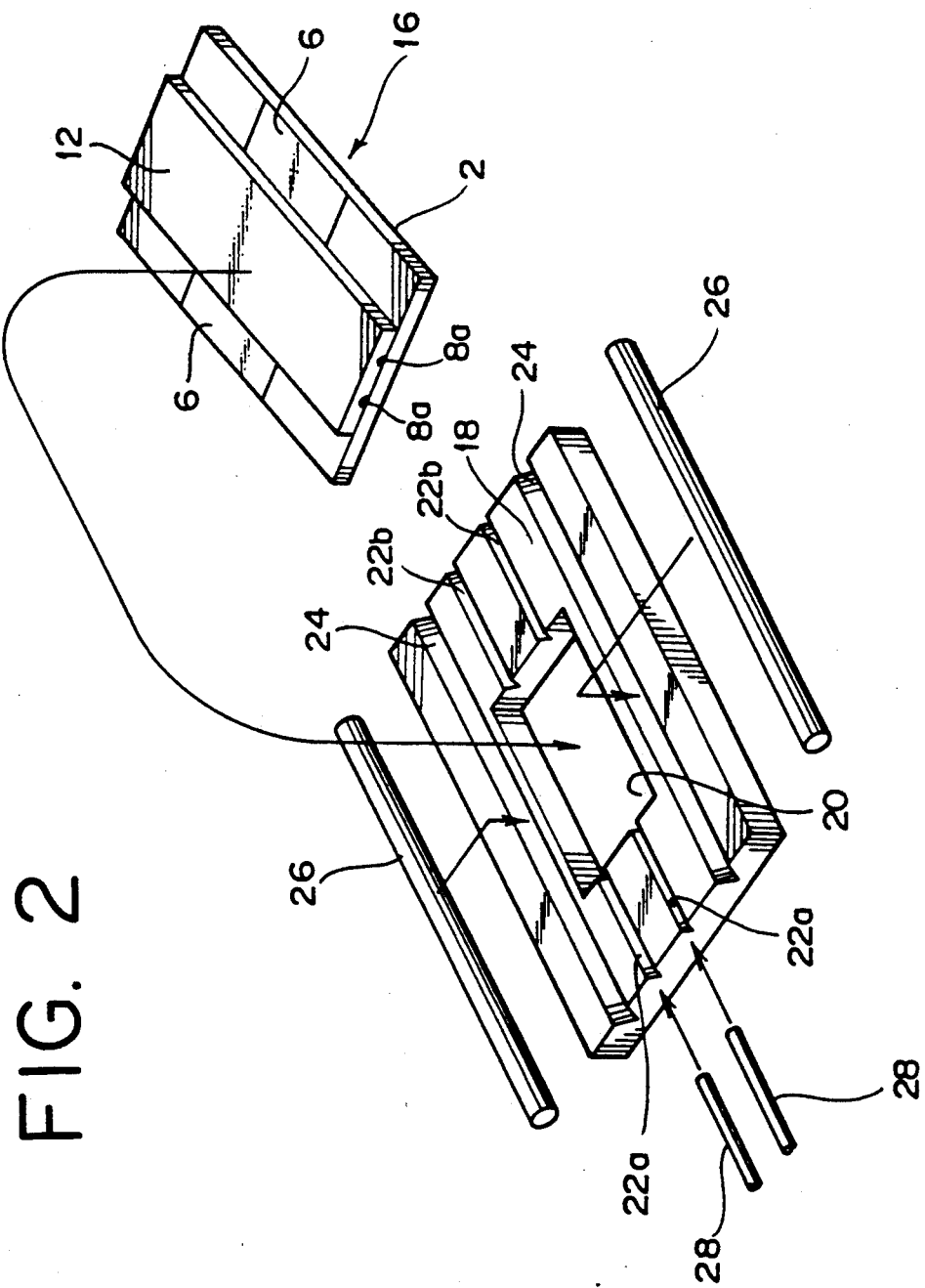
FIG. 2 is an exploded perspective view showing a method for connecting an optical waveguide device with an optical fiber according to an embodiment of the present invention.

Referring first to FIG. 1, a manufacturing process of an optical waveguide device of an embodiment of the present invention will be described. As shown in FIG. 1(A), a first cladding 4 having SiO$_2$ as its main component and having a relatively low refractive index is formed with a uniform thickness on a substrate 2 of Si for example by a CVD method and a visually recognizable Si thin film layer 6, which defines a reference plane, is formed on the first cladding 4 at its opposite edge portions.

Then, as shown in FIG. 1(B), a core layer 8 having a higher refractive index than the first cladding 4 is formed on the first cladding 4 and Si thin film layer 6 and, on the core layer 8, Si patterns 10 in a shape corresponding to the shape of cores to be produced are formed. The core layer 8 can be formed of SiO$_2$ doped with germanium or titanium.

Thereafter, the portion of the core layer 8 where the Si patterns 10 are not formed is removed by etching, whereby a plurality of cores 8a of a predetermined shape are produced as shown in FIG. 1(C), and then, a second cladding 12, of the same quality as the first cladding 4, is formed on the first cladding 4 so as to cover the cores 8a. Since the visually recognizable Si thin film layer 6 is formed on the first cladding 4, the etching of the core layer 8 can be stopped when the core layer is removed to the level of the Si thin film layer 6. If the Si thin film layer 6 were not formed, because the first cladding 4 and the core layer 8 are transparent, it would be very difficult to stop etching of the core layer 8 at the desired position. Since the Si thin film layer 6, being approximately 0.1–0.3 μm thick, is very thin, its top surface is virtually lies in the same plane as the bottom surface of the cores 8a. After the etching of the core layer 8 has been finished, the Si patterns 10 remaining on the cores 8a are removed.

Then, as shown in FIG. 1(D), a mask 14 is formed on the second cladding 12 so as to cover the cores 8a and the exposed portion of the second cladding 12 is removed by etching. Thereby, as shown in FIG. 1(E), that portion of the second cladding 12 is removed and as a result the Si thin film layer 6 defining the reference plane appears uncovered on both sides of the cores 8a.

According to the present embodiment, since the Si thin film layer 6 defining the reference plane can be formed lying virtually in the same plane as the bottom surfaces of the cores 8a, the positioning adjustments between the cores 8a and optical fibers can be achieved easily and reliably by using the reference plane as described later in detail.

In general the cladding covering cores (the second cladding in the present embodiment) is 10 to 20 μm thick and this thickness is liable to fluctuate according to manufacturing conditions. Therefore, it is not advantageous to use the top surface of the second cladding 12 as the reference plane. In order to secure highly precise relative position between the reference plane and the core, it is preferable to form the reference plane on the first cladding 4 as in this embodiment.

While, in the above described embodiment, the visually recognizable reference plane was formed on the first cladding 4, it is also practicable, when etching the core layer 8, to leave portions of the core layer 8 on both sides of the cores 8a unetched and use the top surface of the core layer 8 thus left unetched as the reference plane. In this case, the reference plane is lying in the same plane as the top surfaces of the cores 8a, and thus, the same as in the above described embodiment, highly precise relative position between the reference plane and the cores 8a can be secured.

Referring now to FIG. 2, a method for connecting an optical waveguide with an optical fiber using the optical waveguide device 16 manufactured in the manufacturing process of FIG. 1 will be described. Around the center of a silicon substrate 18, there is formed a rectangular opening 20 capable of receiving the second cladding 12 of the optical waveguide device 16. Between the end faces in the lengthwise direction of the substrate 18 and the wall surfaces of the opening 20, there are formed two each of V grooves 22a and 22b, in parallel, for receiving the optical fibers 28 to be connected. The pitch between the V grooves 22a and 22b is the same as the pitch between the cores 8a of the optical waveguide device 16. The respective V grooves 22a are aligned with the respective V grooves 22b.

The substrate 18 further has two V grooves 24 provided on both sides of the opening 20 extending between both end faces of the substrate in its lengthwise direction. The V grooves 24 are virtually parallel to each other and the V grooves 24 are also virtually parallel to the V grooves 22a and 22b, but they need not be precisely parallel. Reference numeral 26 denotes a columnar rod partly received in the V groove 24. In the present embodiment, the V groove 24 is formed deeper than the V grooves 22a and 22b and the columnar rod 26 is larger in diameter than the optical fiber 28.

In performing the connecting work, the optical fibers 28, and the columnar rods 26, are seated in the V grooves 22a and 22b, and 24, respectively, of the substrate 18 and, then, the optical waveguide device 16 is mounted on the substrate 18 in such a way that the Si thin film layer 6 defining the reference plane of the optical waveguide device 16 comes into contact with the columnar rods 26. The shapes of the V grooves 22a, 22b, and 24 and the diameters of the optical fibers 28 and the columnar rods 26 are set so that each core 8a of the waveguide and the core of the optical fiber 28 are lying in the same plane at this time.

Having such setting made, the optical fiber 28 can be brought into alignment with the core 8a of the waveguide by adjusting the optical waveguide device 16 only in a plane parallel to the surface of the substrate 18, and hence the connection work is quite easy. Actually, the positioning adjustment of the optical waveguide device 16 relative to the optical fiber 28 is carried out, by introducing a laser beam into the optical fiber 28 received in the V groove 22a and connecting the optical fiber received in the V groove 22b to an optical power meter, so that the maximum optical coupling efficiency may be obtained. When the desired relative position between the optical fiber 28 and the core 8a is obtained, the optical waveguide device 16 and the optical fiber 28 are fixed to the substrate 18 with a bonding agent.

The V grooves 22a, 22b, and 24 can be formed with high precision for example by anisotropic etching of silicon. When manufacturing the optical waveguide device according to the process shown in FIG. 1, the relative position between the reference plane and the core 8a of the waveguide can be set up with high precision. Therefore, once the end face of one of the cores 8a of the optical waveguide device 16 has been connected with the optical fiber 28, another optical fiber 28 to be connected to the other core can be brought into accurate confrontation with the core 8a by pushing the optical fiber against the end face of the waveguide along the V groove 22a.

After having the columnar rods 26 received in their respective V grooves 24, the substrate 18 together with the columnar rods 26 may be cut into two laterally around the center in the longitudinal direction, and connection of the optical waveguide device and the optical fiber may be made using each of the divided parts. In this case, the positioning adjustments of the divided optical waveguide devices with respect to the optical fibers must be made for both end faces in the lengthwise direction of the divided optical waveguide devices 16 individually.

Figure 3:
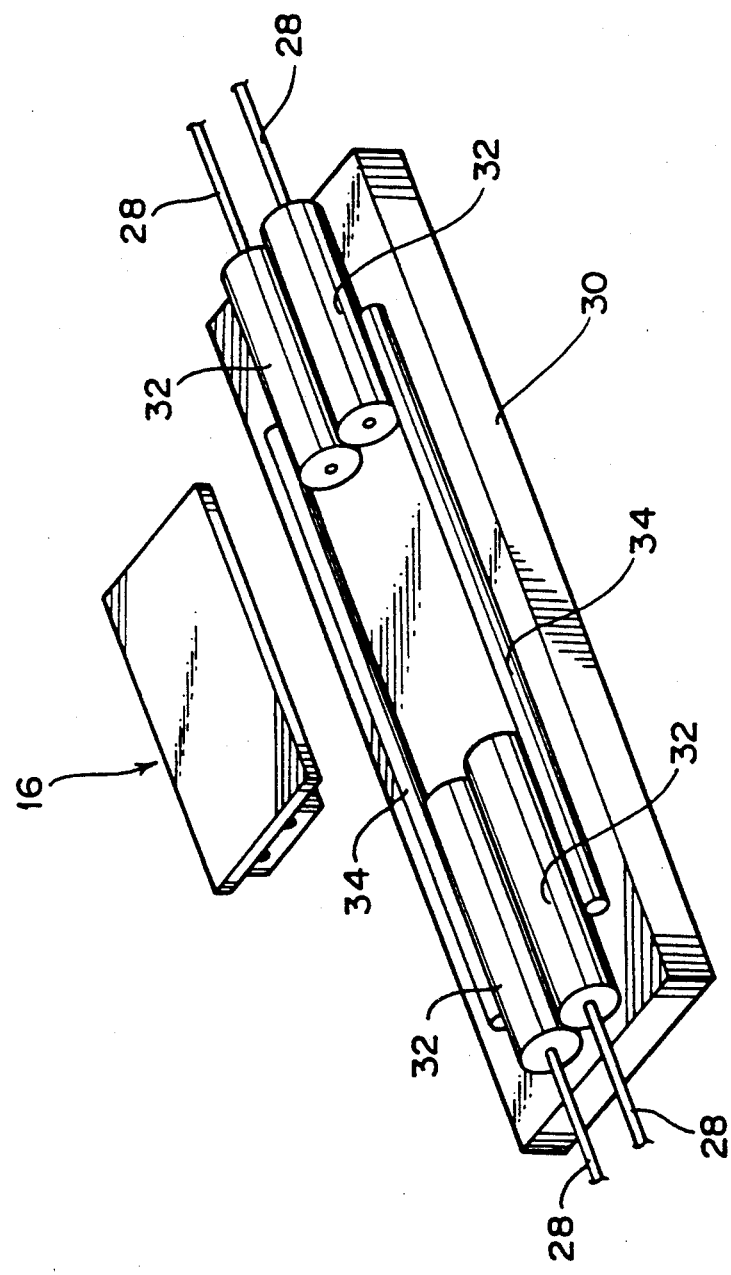
FIG. 3 is an exploded perspective view showing a method for connecting an optical waveguide device with an optical fiber according to another embodiment of the present invention.

Referring now to FIG. 3, a method for connecting optical fibers and optical waveguides according to another embodiment of the present invention will be described. On a substrate 30 made of stainless steel, two each of tube ferrules 32 similarly made of stainless steel, in contact with each other, are fixed on the input side and the output side of the optical waveguide device, respectively. The ferrules 32 on the input side are aligned with their corresponding ferrules 32 on the output side. On the substrate 30, there are further fixed two columnar rods 34 made of stainless steel on both sides of the ferrules 32. An optical fiber 28 is placed in and fixed to each of small central holes of the ferrules 32. The ferrules 32 and the columnar rods 34 are fixed to the substrate 30 for example by laser welding.

In this embodiment, as with the above described embodiment, the optical waveguide device 16 is mounted on the columnar rods 34, and then, only by giving a planar movement to the optical waveguide device 16, that is, by sliding the reference plane of the optical waveguide device 16 along the plane on the columnar rods 34, the positioning adjustment between the cores 8a of the optical waveguide device and the cores of the optical fibers 28 can be achieved easily.

Figure 4:
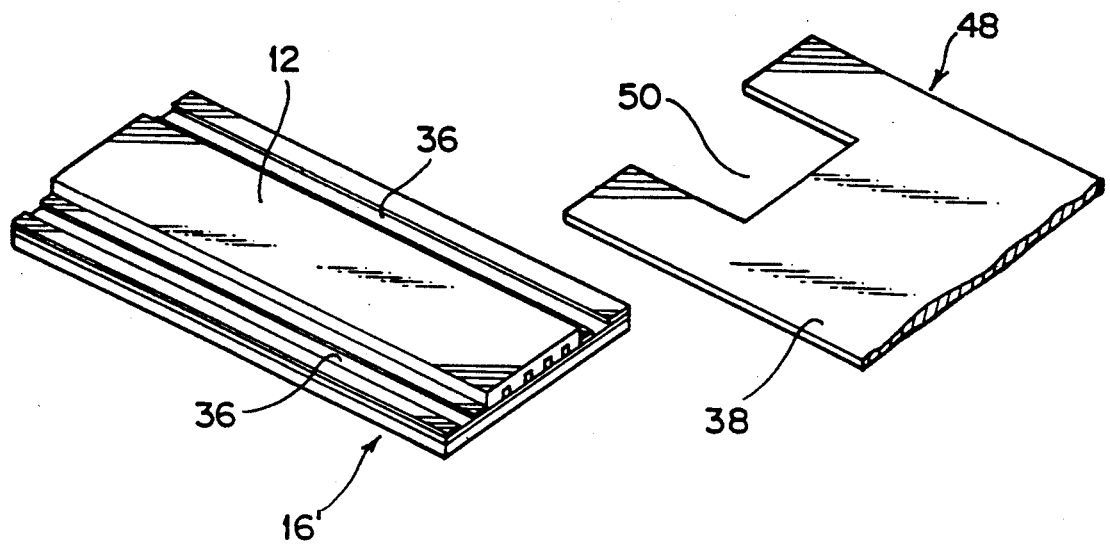
FIG. 4 is an exploded perspective view showing a method for connecting an optical waveguide device with an optical fiber array assembly according to a further embodiment of the present invention.
Figure 5:
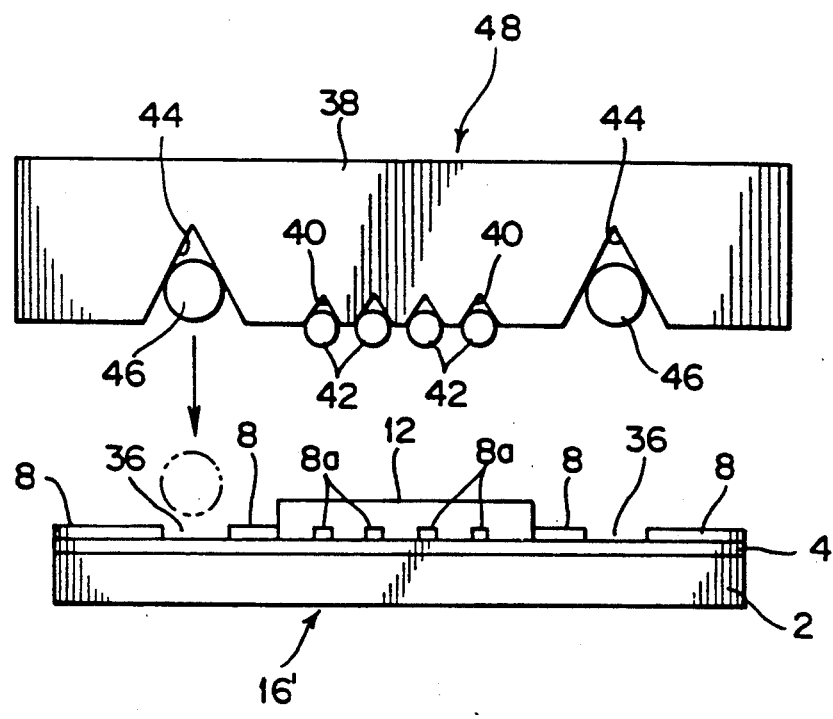
FIG. 5 is an exploded sectional view of the embodiment shown in FIG. 4.

Then, referring to FIG. 4 and FIG. 5, a method for connecting an optical waveguide device and optical fibers according to a further embodiment of the present invention will be described.

In this embodiment, an optical waveguide device 16' having its reference plane on the top surface of the core layer 8 is used. In the core layer 8, there are formed two grooves 36 on both sides of the cores 8a. Reference numeral 48 denotes a fiber array assembly with a plurality of optical fibers 42 fixed in V grooves 40 formed in a plate 38. In the plate 38, there are formed two V grooves 44 on both sides of the optical fibers 42. In each V groove 44, a columnar rod 46 is partially received.

The pitch between the V grooves 40 and the pitch between the cores 8a of the optical waveguide device 16' are equal and the distance between the V grooves 44 and the distance between the grooves 36 are equal. At one end portion of the plate 38, there is formed a rectangular cutting 50 and the end faces of the optical fibers 42 are all terminated at the surface of the wall extending in the lateral direction of the walls defining the cutting 50.

The fiber array assembly 48 is mounted on the optical waveguide device 16' with the columnar rods 46 interposed between the V grooves 44 and the grooves 36. The width of the groove 36, the shapes of the V grooves 40 and 44, and the diameters of the optical fiber 42 and the columnar rods 46 are set up so that the cores of the optical fibers 42 and the cores 8a of the optical waveguide device lie in the same plane at this time. By setting up as above, the relative position between the optical fibers 42 and the columnar rods 46 agrees with the relative position between the cores 8a and the columnar rods 46, and hence the cores of the optical fibers 42 and the cores 8a can be aligned without the need for any adjustment of the optical axis.

More specifically, by pressing the fiber array assembly 48 against the optical waveguide device 16' with the columnar rods 46 interposed between the grooves 36 and the V grooves 44, the end faces of the cores of the optical fibers 42 and the end faces of the cores 8a of the optical waveguide device 16' can be brought into confrontation and contact with each other. By fixing the fiber array assembly 48 to the optical waveguide device 16' in this state with a bonding agent, permanent connections between the optical fibers and the cores of the optical waveguides can be realized. According to the present embodiment, the optical fiber array and the optical waveguide device can be connected without the need for adjustment.

In the foregoing, embodiments in which the present invention was applied to a quartz type optical waveguide was described, but the present invention is not limited to that. It can also be applied to an optical waveguide device formed of a plastic material such as polymethyl methacrylate.

What is claimed is:

1. An optical waveguide device comprising:
a substrate having a top surface;
a first cladding of a uniform thickness formed on said substrate;
a core formed on said first cladding;
a thin layer formed on said first cladding on both sides of said core, said thin layer extending towards said core and being spaced therefrom, said thin layer being formed of a material different from that of said first cladding and said core, so as to be visually recognizable, said thin layer defining a reference plane which is parallel to the top surface of said substrate and lies in the same plane as a bottom surface of said core; and
a second cladding formed on said first cladding so as to cover said core, said second cladding having a predetermined shape allowing said thin layer to be exposed.

2. An optical waveguide device comprising:
a substrate having a top surface;
a first cladding of a uniform thickness formed on said substrate;
a core formed on said first cladding;
a reference layer being of the same thickness as said core and formed on said first cladding on both sides of said core, said reference layer defining a reference plane lying in the same plane as the top surface of said core, said reference layer being made of the same material as that of said core, and
a second cladding formed on said first cladding so as to cover said core, said second cladding having a predetermined shape allowing said reference layer to be exposed.

3. A method for connecting an optical waveguide with an optical fiber, comprising the steps of:
preparing an optical waveguide device comprising a substrate, a first cladding formed on said substrate, a core formed on said first cladding, a thin layer formed on said first cladding on both sides of said core, said thin layer extending towards said core and being spaced therefrom and being of a material different from those of said first cladding and said core as to be visually recognizable and defining a reference plane which is parallel to a top surface of said substrate and lies in the same plane as a bottom surface of said core, and a second cladding having a predetermined shape formed on said first cladding to allow said thin layer to be exposed;

preparing a support substrate having an opening formed therein of the same shape as said second cladding of said optical waveguide device, a first groove formed therein such that it extends from one end to the other end of said support substrate and crossing over said opening, and a pair of second grooves formed therein on both sides of said opening;

placing an optical fiber in said first groove;

placing columnar rods in said pair of second grooves;

mounting said optical waveguide device on said support substrate such that said second cladding is received in said opening and said reference plane abuts on said columnar rods;

adjusting a position of said optical waveguide device in a plane with said reference plane held in contact with said columnar rods so that said optical fiber is aligned with said core; and bonding said optical waveguide device and said optical fiber to said support substrate.

4. A method for connecting an optical waveguide with an optical fiber, comprising the steps of:

preparing an optical waveguide device comprising a substrate, a first cladding formed on said substrate, a core formed on said first cladding, a thin layer formed on said first cladding on both sides of said core, said thin layer extending towards said core and being spaced therefrom and being made of a material different from those of said first cladding and said core so as to be visually recognizable and defining a reference plane which is parallel to a top surface of said substrate and lies in the same plane as a bottom surface of said core, and a second cladding having a predetermined shape formed on said first cladding so as to allow said thin layer to be exposed;

fixing a ferrule, with an optical fiber inserted and fixed therein, to a support substrate;

fixing a pair of columnar rods on said support substrate on both sides of said ferrule in such a way that said rods are extended parallel to the longitudinal direction of said ferrule;

mounting said optical waveguide device on said support substrate such that said reference plane abuts on said columnar rods;

adjusting a position of said optical waveguide device in a plane with said reference plane held in contact with said columnar rods so that said optical fiber is aligned with said core; and bonding said optical waveguide device to said support substrate.

5. A method for connecting optical waveguides with optical fibers, comprising the steps of:

preparing an optical waveguide device comprising a substrate, a first cladding formed on said substrate, a plurality of cores formed on said first cladding at a predetermined pitch, a reference layer formed on said first cladding on both sides of said cores and being of the same thickness with said cores, said reference layer extending towards said cores and being spaced therefrom and being formed of a material different from those of said first cladding and said cores so as to be visually recognizable and defining a reference plane lying in the same plane as a top surface of said cores, and a second cladding formed on said first cladding so as to cover said cores, said reference layer having a pair of grooves formed therein spaced apart a predetermined distance sandwiching said cores;

preparing a fiber array assembly comprising a plate and a plurality of optical fibers fixed on said plate at the same pitch as the pitch between the said plurality of cores, said fiber array assembly having a pair of first V grooves formed therein spaced apart the same distance as said grooves and a cutout formed in one end portion thereof, and end faces of said optical fibers being terminated at an edge of said cutout;

mounting said fiber array assembly on said optical waveguide device with columnar rods having a predetermined diameter and interposed between said grooves and said first V grooves;

pressing said fiber array assembly against said optical waveguide device so that the end faces of said optical fibers are placed in contact with end faces of said cores; and bonding said fiber array assembly to said optical waveguide device.

6. A method for connecting optical waveguides with optical fibers according to claim 5, wherein said plate has a plurality of second V grooves arranged at the same pitch as the pitch between said cores and each of said optical fibers is placed in and bonded to each of said second V grooves.

* * * * *